(12) United States Patent
Lee et al.

(10) Patent No.: US 11,241,971 B2
(45) Date of Patent: Feb. 8, 2022

(54) ON-BOARD CHARGER, VEHICLE INCLUDING THE SAME, AND METHOD OF OPERATING THE ON-BOARD CHARGER

(71) Applicants: HYUNDAI MOTOR COMPANY, Seoul (KR); KIA MOTORS CORPORATION, Seoul (KR)

(72) Inventors: Dong Jun Lee, Suwon-si (KR); Young Jin Jang, Pohang-si (KR); Won Yong Sung, Suwon-si (KR); Hye Seung Kim, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 379 days.

(21) Appl. No.: 16/357,684

(22) Filed: Mar. 19, 2019

(65) Prior Publication Data

US 2020/0180452 A1   Jun. 11, 2020

(30) Foreign Application Priority Data

Dec. 7, 2018   (KR) .......... 10-2018-0156552

(51) Int. Cl.
*B60L 53/62* (2019.01)
*B60L 53/22* (2019.01)
*H02J 7/00* (2006.01)
*B60L 3/00* (2019.01)

(52) U.S. Cl.
CPC .......... *B60L 53/62* (2019.02); *B60L 3/0069* (2013.01); *B60L 53/22* (2019.02); *H02J 7/007* (2013.01)

(58) Field of Classification Search
CPC .......................................... B60L 53/62
USPC .......................................... 320/109
See application file for complete search history.

(56) References Cited

U.S. PATENT DOCUMENTS

| | | | | |
|---|---|---|---|---|
| 2005/0227662 | A1* | 10/2005 | Adachi | H04B 1/109 455/283 |
| 2011/0317455 | A1* | 12/2011 | Azuma | H02M 7/48 363/37 |
| 2013/0147419 | A1* | 6/2013 | Sakai | H02P 27/04 318/722 |
| 2013/0245869 | A1* | 9/2013 | Nishida | B60L 15/20 701/22 |
| 2014/0191720 | A1* | 7/2014 | Sugiyama | B60L 58/21 320/109 |
| 2014/0210411 | A1* | 7/2014 | Fluxa | B60L 53/18 320/109 |
| 2018/0287466 | A1* | 10/2018 | Kim | H02H 7/08 |

* cited by examiner

*Primary Examiner* — Jerry D Robbins
(74) *Attorney, Agent, or Firm* — Lempia Summerfield Katz LLC

(57) ABSTRACT

A method of operating an on-board charger for charging a high voltage battery of an electrically-charged vehicle includes supplying a DC voltage obtained by converting an AC voltage to the high voltage battery to perform a charging operation, measuring an internal voltage of a DC EMI filter for removing noise of the DC voltage, generating a leakage current estimate based on the internal voltage, and controlling the charging operation in accordance with the leakage current estimate.

18 Claims, 7 Drawing Sheets

ON-BOARD CHARGER, VEHICLE INCLUDING THE SAME, AND METHOD OF OPERATING THE ON-BOARD CHARGER

CROSS-REFERENCE TO RELATED APPLICATION

This application is based on and claims the benefit of priority to Korean Patent Application No. 10-2018-0156552, filed on Dec. 7, 2018, in the Korean Intellectual Property Office, the disclosure of which is incorporated herein in its entirety by reference.

TECHNICAL FIELD

The present disclosure relates to an on-board charger (OBC) performing an operation for protecting an electric vehicle from a leakage current when the electric vehicle is charged, a vehicle including the on-board charger, and a method of operating the on-board charger.

BACKGROUND

An on-board charger (OBC) is a charging device, which is supplied with an AC power source and charges a battery with a high voltage for an in-vehicle motor, to charge a vehicle using an electric charging method, such as a plug-in hybrid electric vehicle (PHEV) and an electric vehicle (EV).

SUMMARY

An aspect of the present disclosure provides an OBC capable of adding leakage current sensing and protection functions to a non-isolated OBC without a separate leakage current sensor, a vehicle including the OBC, and a method of operating the OBC.

According to an aspect of the present disclosure, a method of operating an on-board charger for charging a high voltage battery of an electrically-charged vehicle includes supplying a DC voltage obtained by converting an AC voltage to the high voltage battery to perform a charging operation, measuring an internal voltage of a DC EMI filter for removing noise of the DC voltage, generating a leakage current estimate based on the internal voltage, and controlling the charging operation in accordance with the leakage current estimate.

According to another aspect of the present disclosure, an on-board charger for charging a high voltage battery of an electrically-charged vehicle includes a power conversion device that supplies a DC voltage obtained by converting an AC voltage to the high voltage battery to perform a charging operation and a controller including a DC voltage measuring device that measures an internal voltage of a DC EMI filter included in the power conversion device for removing noise of the DC voltage, a leakage current estimating device that generates a leakage current estimate based on the internal voltage, and a leakage current protecting device that controls the charging operation in accordance with the leakage current estimate.

According to another aspect of the present disclosure, an electrically-charged vehicle includes the OBC, a high voltage battery charged with the DC voltage provided from the OBC, and an inverter that drives a motor using the DC voltage discharged from the high voltage battery.

According to the OBC, the vehicle including the OBC, and the method of operating the OBC, the actual leakage current value may be accurately estimated without using a separate leakage current sensor.

In addition, since the leakage current path is blocked when the leakage current instantaneously increases, the cut-off operation by the earth leakage circuit breaker may be prevented or avoided in advance. Further, the charging state may be maintained even when the leakage current is abnormally high, and thus the charging robustness may be enhanced.

BRIEF DESCRIPTION OF THE DRAWINGS

The above and other aspects, features and advantages of the present disclosure will be more apparent from the following detailed description taken in conjunction with the accompanying drawings.

DETAILED DESCRIPTION

Figure 1:
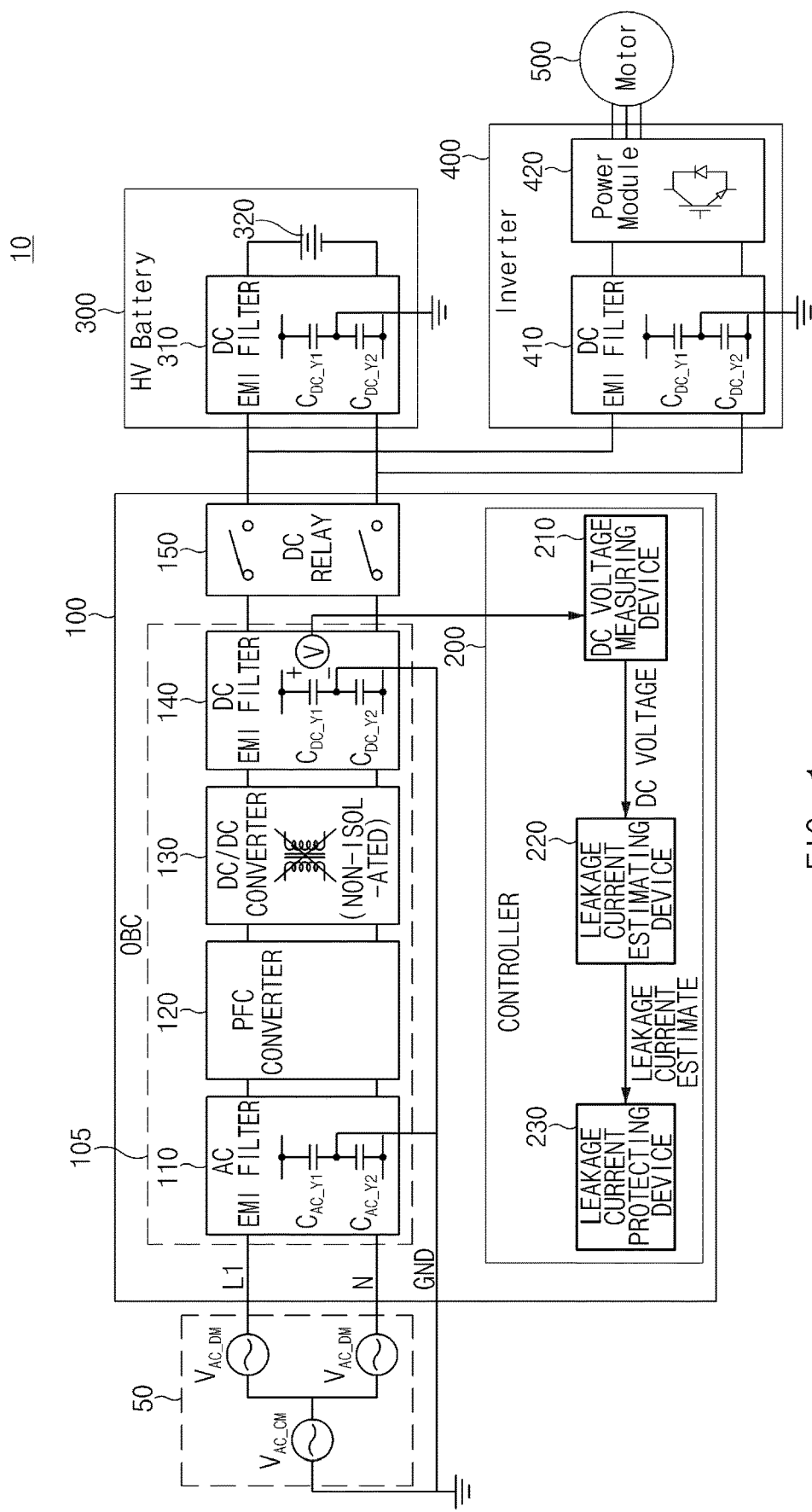
FIG. 1 is a view showing an electrically-charged vehicle according to an embodiment of the present disclosure.

Hereinafter, embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of embodiments of the present disclosure, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

In some implementations, the OBC includes a power factor correction (PFC) converter for power factor control and conversion of AC power to DC power, a direct-current to direct-current (DC-DC) converter for output control, and an electromagnetic interference (EMI) filter for meeting electromagnetic wave shielding performance.

The DC-DC converter is designed as an isolation-type DC-DC converter to separate the AC power source from a DC power source when the OBC is designed. In case of the OBC including the isolation-type DC-DC converter, a transformer is provided to the OBC for the insulation of the OBC. In the separated power system as described above, a leakage current path is blocked in the OBC, and a stable operation of the OBC is possible. However, a production cost of the OBC increases, and it is not suitable for miniaturization and weight reduction. Accordingly, when the transformer is removed when designing the OBC, the production cost and a size of the OBC are reduced, and this is called a non-isolated OBC.

However, in the non-isolated OBC, a common-mode (CM) voltage of the AC power source exerts an influence on a Y-capacitor of the DC side since an AC terminal is not separated from a DC terminal, and as a result, the leakage current increases. When a level of the leakage current is higher than a detection level of an earth leakage circuit breaker of an AC power source terminal, the AC power source is cut off by the earth leakage circuit breaker, and the battery charging is disabled.

Therefore, in embodiments, the non-isolated OBC includes a leakage current sensing function and a protection function for the stable operation of the non-isolated OBC.

FIG. 1 is a view showing an electrically-charged vehicle 10 according to an embodiment of the present disclosure.

Referring to FIG. 1, the electrically-charged vehicle 10 may be a vehicle that receives an AC power from an external AC power source 50, stores the AC power in its internal battery, and converts an electric energy stored in the battery to use the converted energy as a vehicle's power source. For example, the electrically-charged vehicle 10 may be a vehicle using an electric charging method, such as a plug-in hybrid electric vehicle (PHEV) and an electric vehicle (EV).

The electrically-charged vehicle 10 may include an on-board charger (OBC) 100, a high voltage (HV) battery 300, an inverter 400, and a motor 500.

The OBC 100 may be electrically connected to the external AC power source 50, may convert an AC voltage to a DC voltage to generate the DC voltage, and may apply the DC voltage to the HV battery 300 or the inverter 400. The OBC 100 may be connected to the external AC power source 50 via a terminal L1, a terminal N, and a ground terminal GND. In embodiments, the AC power source 50 may be modeled as one commercial AC power source connected between the terminal L1 and the terminal N or as one common mode power source and two differential mode power sources as shown in FIG. 1.

The OBC 100 may include an AC EMI filter 110, a power factor correction (PFC) converter 120, a DC/DC converter 130, a DC EMI filter 140, a DC relay 150, and a controller 200. The invention is not limited to components of the OBC 100 discussed above, and some elements may be added, or other components may be omitted. Each component of the OBC 100 may be implemented by hardware, software, or a combination of hardware and software. In the present embodiment, the AC EMI filter 110, the PFC converter 120, the DC/DC converter 130, and the DC EMI filter 140 may be collectively referred to as a power conversion device 105.

The AC EMI filter 110 may remove electrical noise included in the AC voltage provided from the AC power source 50 for meeting the electromagnetic wave shielding performance. As shown in FIG. 1, the AC EMI filter 110 may include a Y-capacitor, the Y-capacitor may include two capacitors $C_{AC\_Y1}$ and $C_{AC\_Y2}$ connected to each other in series, and a node between the two capacitors $C_{AC\_Y1}$ and $C_{AC\_Y2}$ may be connected to the ground terminal.

The PFC converter 120 may convert the AC voltage to the DC voltage, may output the DC voltage, and, substantially simultaneously, may correct a power factor of the voltage. In embodiments, the PFC converter 120 may perform a rectifying operation to convert the AC voltage to the DC voltage and may reduce a difference in phase between an input current and an input voltage to increase the power factor. According to an embodiment, the power factor control of the PFC converter 120 may be controlled by the controller 200.

The DC/DC converter 130 may be a non-isolated DC-DC converter, which does not include a transformer, and may change a level of an output voltage of the PFC converter 120. The DC/DC converter 130 may have a full-bridge and/or half-bridge structure, however, the present invention should not be limited thereto or thereby. According to an embodiment, a level of an output voltage of the DC/DC converter 130 may be controlled by the controller 200.

The DC EMI filter 140 may remove electrical noise included in the output voltage of the DC/DC converter 130 for meeting the electromagnetic wave shielding performance. As shown in FIG. 1, the DC EMI filter 140 may include a Y-capacitor, the Y-capacitor may include two capacitors $C_{DC\_Y1}$ and $C_{DC\_Y2}$ connected to each other in series, and a node between the two capacitors $C_{DC\_Y1}$ and $C_{DC\_Y2}$ may be connected to the ground terminal.

The DC relay 150 may transmit or block an output voltage of the DC EMI filter 140 to the HV battery 300 and/or the inverter 400 in response to the control by the controller 200. The DC relay 150 may include two switches that are opened and closed in response to the control by the controller 200, however, the present invention should not be limited thereto or thereby.

The controller 200 may control an overall operation of the OBC 100 and may communicate with another component (e.g., the HV battery 300) of the electrically-charged vehicle 10. In embodiments, the controller 200 may estimate the leakage current based on an internal voltage of the DC EMI filter 140 and may control a charging of the HV battery 300 or may control whether to block a current path using the DC relay 150 according to the leakage current estimate. In embodiments, since the controller 200 estimates the leakage current leaking to the AC power source 50 using a method of indirectly estimating a level of the leakage current without using a separate leakage current sensor that directly senses the leakage current, e.g., a zero phase current transformer (ZCT) or a leakage current sensor with a shunt resistor method, a manufacturing cost of products may be reduced.

The controller 200 may include a DC voltage measuring device 210, a leakage current estimating device 220, and a leakage current protecting device 230.

The DC voltage measuring device 210 may measure the internal voltage of the DC EMI filter 140 and may provide the DC voltage indicating a voltage level to the leakage current estimating device 220. In the embodiment, the internal voltage of the DC EMI filter 140 may be the voltage across the Y capacitor $C_{DC\_Y1}$, and the DC voltage measuring device 210 may measure the voltage across the Y capacitor $C_{DC\_Y1}$ and may provide the DC voltage to the leakage current estimating device 220.

The leakage current estimating device 220 may estimate the leakage current based on the DC voltage to generate or compute the leakage current estimate. The operation of the leakage current estimating device 220 will be described in detail later with reference to FIGS. 2 to 4.

The leakage current protecting device 230 may control whether to charge the HV battery 300 or whether to block the current path through the DC relay 150 based on the leakage current estimate. To this end, the leakage current protecting device 230 may store and update values, for example, a protecting level, a failure count, and a count upper limit that are the basis of the controls. The operation of the leakage current protecting device 230 will be described in detail later with reference to FIGS. 5 and 6.

The HV battery 300 may be charged or discharged with a charging voltage of high voltage (e.g., about 240 volts to about 413 volts) using the DC voltage provided from the OBC 100. The HV battery 300 may include a DC EMI filter 310 and a rechargeable battery 320.

The DC EMI filter 310 may remove electrical noise included in the DC voltage used to charge or discharge the rechargeable battery 320 for meeting the electromagnetic wave shielding performance. As shown in FIG. 1, the DC EMI filter 310 may include a Y-capacitor, the Y-capacitor may include two capacitors $C_{DC\_Y1}$ and $C_{DC\_Y2}$ connected to each other in series, and a node between the two capacitors $C_{DC\_Y1}$ and $C_{DC\_Y2}$ may be connected to the ground terminal.

The rechargeable battery 320 may be charged with the DC voltage as an electric energy or may discharge the charged electric energy as the DC voltage. The rechargeable battery 320 may be a lithium-ion battery, however, it should not be limited to the lithium-ion battery. Meanwhile, the rechargeable battery 320 may be charged or discharged by a charge controller included in the HV battery 300. In addition, the charge controller may transmit and receive data to and from the OBC 100 via an in-vehicle communication, and particularly, the charge controller may receive a charge stop request from the OBC 100 to stop charging of the rechargeable battery 320 in response to the charge stop request and may start charging the rechargeable battery 320 in response to a charge restart request.

The inverter 400 may generate a driving signal required to drive the motor 500 using the DC voltage provided from the HV battery 300 or the OBC 100. The inverter 400 may include a DC EMI filter 410 and a power module 420.

The DC EMI filter 410 may remove electrical noise included in the DC voltage provided from the HV battery 300 or the OBC 100 for meeting the electromagnetic wave shielding performance. As shown in FIG. 1, the DC EMI filter 410 may include a Y-capacitor, the Y-capacitor may include two capacitors $C_{DC\_Y1}$ and $C_{DC\_Y2}$ connected to each other in series, and a node between the two capacitors $C_{DC\_Y1}$ and $C_{DC\_Y2}$ may be connected to the ground terminal.

The power module 420 may convert the DC voltage and may generate the driving signal to drive the motor 500. According to an embodiment, the power module 420 may be a 3-phase inverter, however, the present invention should not be limited thereto or thereby.

The motor 500 may be a driving motor that rotates in response to the driving signal to provide a power to the electrically-charged vehicle 10.

Figure 2:
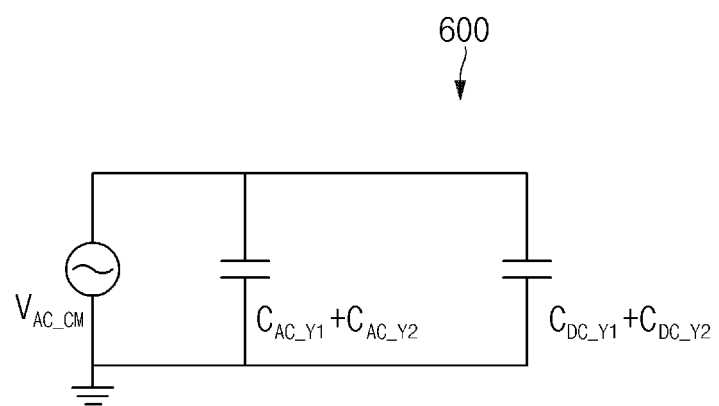
FIG. 2 is a circuit diagram showing an example of an equivalent circuit of an OBC with respect to a common-mode component of an AC power source.
Figure 3:
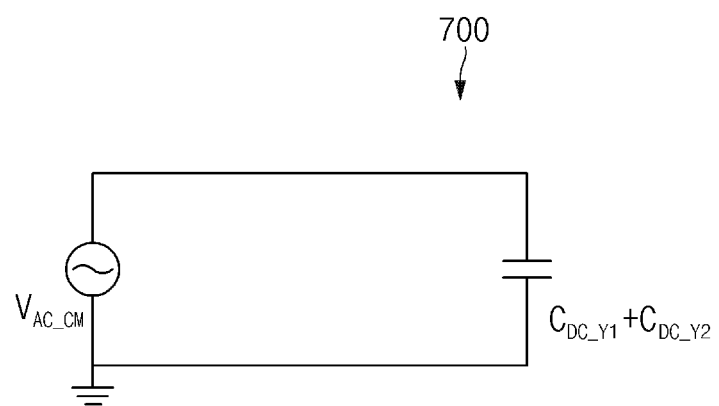
FIG. 3 is a circuit diagram showing another example of the equivalent circuit of the OBC with respect to the common-mode component of the AC power source.

FIG. 2 is a circuit diagram showing an example of an equivalent circuit of the OBC with respect to the common-mode component of the AC power source. FIG. 3 is a circuit diagram showing another example of the equivalent circuit of the OBC with respect to the common-mode component of the AC power source.

Referring to FIGS. 1 to 3, when the AC power source 50 is connected to the OBC 100 and no abnormality exists in the insulating between the high voltage terminals L1 and N and the ground terminal GND of the OBC 100, the leakage current occurs along a path of the Y-capacitor $C_{AC\_Y1}$, $C_{AC\_Y2}$, $C_{DC\_Y1}$, and $C_{DC\_Y2}$. In this case, the level of the leakage current is determined depending on a capacitance of the Y-capacitor $C_{AC\_Y1}$, $C_{AC\_Y2}$, $C_{DC\_Y1}$, and $C_{DC\_Y2}$.

Accordingly, among components of the OBC 100, the equivalent circuit constructed by disregarding remaining components except for a common mode power source $V_{AC\_CM}$ of the AC power source 50 and the Y-capacitor $C_{AC\_Y1}$, $C_{AC\_Y2}$, $C_{DC\_Y1}$ and $C_{DC\_Y2}$ among components of the OBC 100 is as shown in FIG. 2, and the common mode power source $V_{AC\_CM}$ may have a structure connected to the Y-capacitor $C_{AC\_Y1}$ and $C_{AC\_Y2}$ and the Y-capacitor $C_{DC\_Y1}$ and $C_{DC\_Y2}$, which are connected in parallel to each other.

Meanwhile, in embodiments, since high voltage parts, such as the HV battery 300 and the inverter 400, are connected in parallel to a DC voltage output side of the OBC 100, the Y-capacitor $C_{DC\_Y1}$ and $C_{DC\_Y2}$ is designed to have the capacitance significantly greater than the capacitance of the Y-capacitor $C_{AC\_Y1}$ and $C_{AC\_Y2}$ to ensure EMI performance.

Therefore, the Y-capacitor $C_{AC\_Y1}$ and $C_{AC\_Y2}$ of the AC EMI filter 110 may be disregarded in the equivalent circuit of FIG. 2, and the equivalent circuit constructed by disregarding the Y-capacitor $C_{AC\_Y1}$ and $C_{AC\_Y2}$ is as shown in FIG. 3. The common mode power source $V_{AC\_CM}$ may have a structure connected in series to the Y-capacitor $C_{DC\_Y1}$ and $C_{DC\_Y2}$ of the DC power source side.

In embodiments, according to the assumption in the equivalent circuit 700, the leakage current may be defined as a current flowing through an equivalent capacitance $C_{DC\_Y1}+C_{DC\_Y2}$. The configuration and operation of the leakage current estimating device 220 that estimates the leakage current according to the above assumption will be described in detail with reference to FIG. 4.

Figure 4:
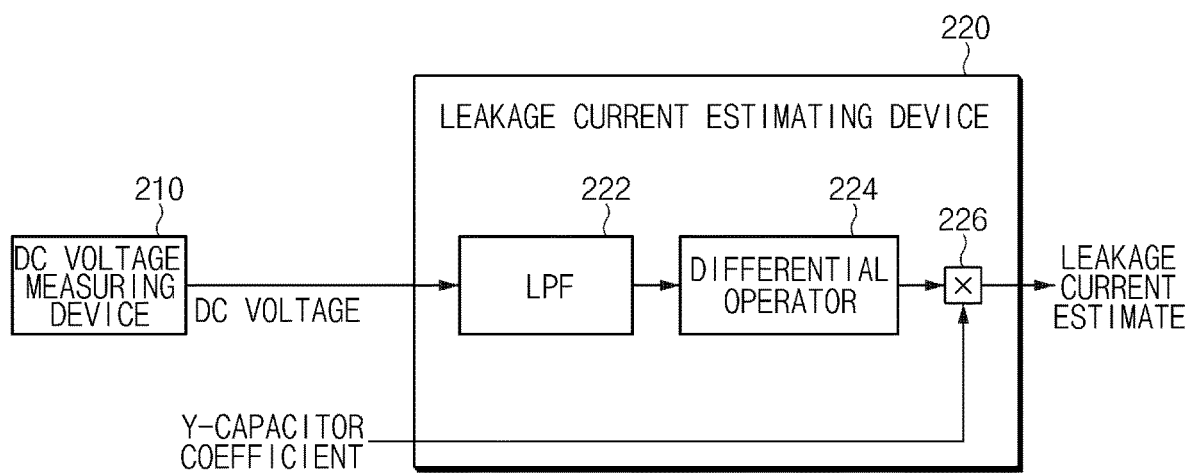
FIG. 4 is a block diagram showing a leakage current estimating device shown in FIG. 1.

FIG. 4 is a block diagram showing the leakage current estimating device 220 shown in FIG. 1.

Referring to FIG. 4, the leakage current estimating device 220 may include a low pass filter (LPF) 222, a derivative operator 224, and a multiplication operator 226.

The LPF 222 may remove high frequency noise components of the internal voltage corresponding to the voltage across the Y-capacitor $C_{DC\_Y1}$, which is measured by the DC voltage measuring device 210. For example, the LPF 222 may be a low pass filter that passes a low frequency-band equal to or smaller than about 1 kHz.

The derivative operator 224 may perform a time derivative on the voltage level of the internal voltage from which the noise is removed to measure a current flowing the Y-capacitor $C_{DC\_Y1}$ and may divide the measured current by the capacitance of the Y-capacitor $C_{DC\_Y1}$ to calculate the current per a unit capacitance. This calculation is based on a principle in which a current flowing through a capacitor corresponds to a value obtained by multiplying a capacitance of the capacitor by a time derivative value of the voltage across the capacitor.

The multiplication operator 226 may multiply the current according to the unit capacitance, which is provided from the derivative operator 224, by a Y-capacitor coefficient to calculate the leakage current estimate. In the embodiment, the Y-capacitor coefficient may mean the equivalent capacitance $C_{DC\_Y1}+C_{DC\_Y2}$ of the equivalent circuit 700 shown in FIG. 3. According to another embodiment, the multiplication operator 226 may multiply the current per a unit capacitance, which is provided from the derivative operator 224, by the equivalent capacitance $C_{AC\_Y1}+C_{AC\_Y2}+$ $C_{DC\_Y1}+C_{DC\_Y2}$ of the equivalent circuit 600 shown in FIG. 2 to calculate the leakage current estimate.

Figure 5:
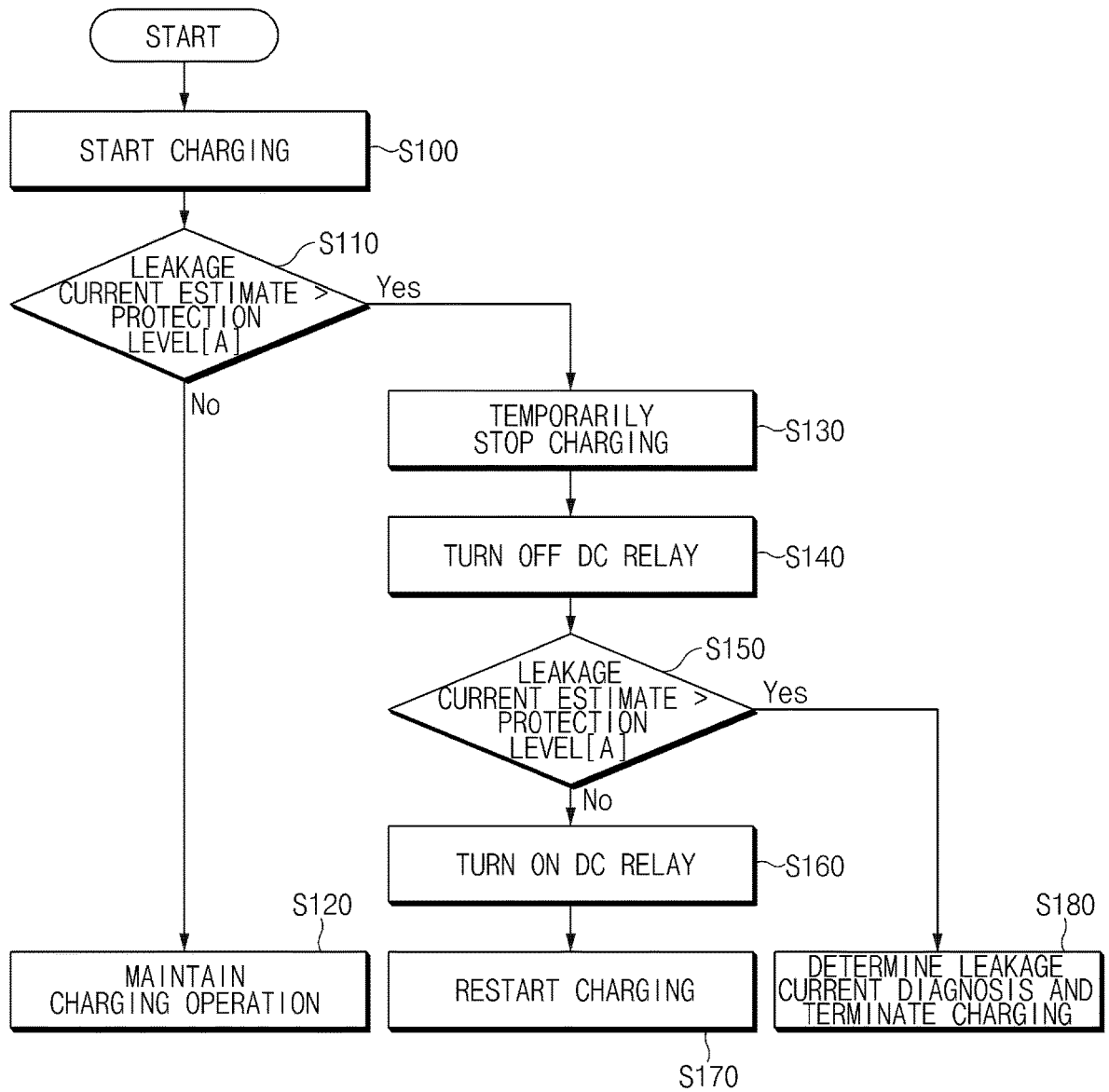
FIG. 5 is a flowchart showing a method of operating the OBC according to an embodiment of the present disclosure.

FIG. 5 is a flowchart showing a method of operating the OBC according to an embodiment of the present disclosure.

Referring to FIG. 5, it is assumed that the OBC 100 is connected to the AC power source 50 and the HV battery 300 is charged with the DC voltage output through the OBC 100 (S100).

The leakage current estimating device 220 of the controller 200 may periodically generate the leakage current estimate according to a predetermined period during the charging operation, and the leakage current protecting device 230 may compare the leakage current estimate with a predetermined protection level (S110). In the embodiment, the protection level may be determined by a protection level of an earth leakage circuit breaker included in a power supply for the electrically-charged vehicle, which provides the AC power source 50, and the protection level of the earth leakage circuit breaker may be a standardized value for a commercialized power supply for the electrically-charged vehicle.

According to an embodiment, the protection level may be smaller than the protection level of the earth leakage circuit breaker by a predetermined value. When the leakage current instantaneously increases, the leakage current path is blocked and the cut-off operation by the earth leakage circuit breaker may be prevented or minimized in advance. In addition, even though the leakage current is abnormally high, the charging state is maintained, and thus a charging robustness may be enhanced.

When the leakage current estimate is not higher than the protection level (No of S110), the OBC 100 and the HV battery 300 may maintain the charging operation (S120). After a predetermined period elapses, operation S110 may be repeated.

When the leakage current estimate is higher than the protection level (Yes of S110), the leakage current protecting device 230 may transmit the charge stop request to the HV battery 300 to temporarily stop the charging of the HV battery (S130).

The leakage current protecting device 230 may control the DC relay 150 right after the charging of the HV battery 300 is temporarily stopped to cut off the leakage current path (S140). In embodiments, since a Y-capacitor path with parts of the DC power source is blocked when the DC relay 150 is turned off, the leakage current of the entire vehicle may be reduced, and it is possible to provide an environment capable of diagnosing whether the leakage current due to the common mode power source of the AC power source 50 is currently occurring.

Then, after a predetermined time elapses, the leakage current protecting device 230 may compare the leakage current estimate with the predetermined protection level again (S150).

When the leakage current estimate is not higher than the protection level (No of S150), the leakage current protecting device 230 may turn on the DC relay 150 (S160).

The leakage current protecting device 230 may transmit the charge restart request to the HV battery 300 and may restart the charging of the HV battery 300 (S170).

When the leakage current estimate is still higher than the protection level (Yes of S150), it is estimated that the leakage current occurs in the same manner as before even when the DC relay 150 is turned off. Accordingly, the leakage current protecting device 230 may determine the diagnosis result in which the leakage current occurs and may terminate the charging of the HV battery 300 without transmitting the charge restart request to the HV battery 300 (S180).

Figure 6:
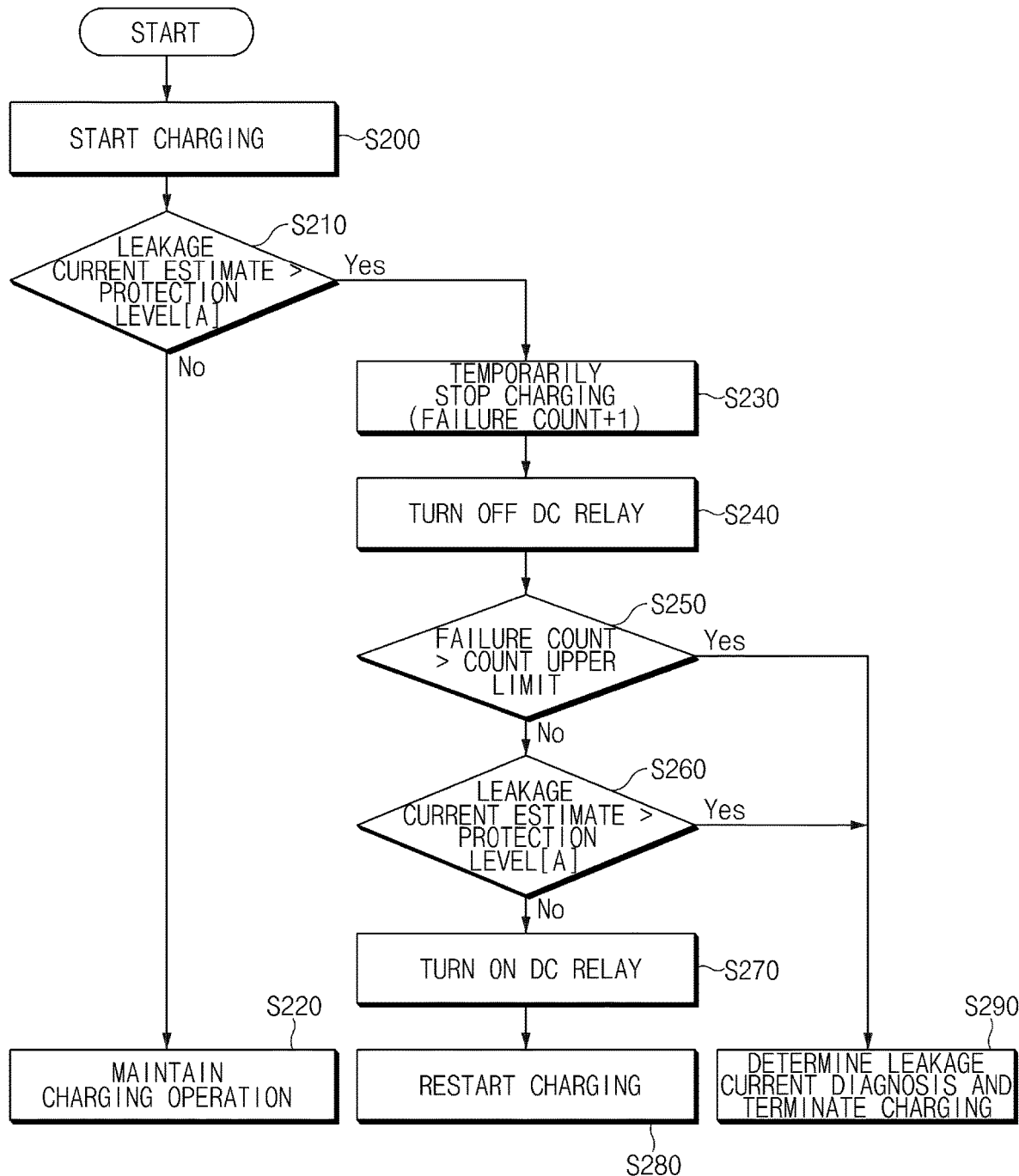
FIG. 6 is a flowchart showing a method of operating the OBC according to another embodiment of the present disclosure.

FIG. 6 is a flowchart showing a method of operating the OBC according to another embodiment of the present disclosure.

Referring to FIG. 6, it is assumed that the OBC 100 is connected to the AC power source 50 and the HV battery 300 is charged with the DC voltage output through the OBC 100 (S200).

The leakage current estimating device 220 of the controller 200 may periodically generate the leakage current estimate according to a predetermined period during the charging operation, and the leakage current protecting device 230 may compare the leakage current estimate with a predetermined protection level (S210). In the embodiment, the protection level may be determined by a protection level of an earth leakage circuit breaker included in a power supply for the electrically-charged vehicle, which provides the AC power source 50, and the protection level of the earth leakage circuit breaker may be a standardized value for a commercialized power supply for the electrically-charged vehicle.

According to an embodiment, the protection level may be smaller than the protection level of the earth leakage circuit breaker by a predetermined value. When the leakage current instantaneously increases, the leakage current path is blocked and the cut-off operation by the earth leakage circuit breaker may be prevented or avoided in advance. In addition, even though the leakage current is abnormally high, the charging state is maintained, and thus a charging robustness may be enhanced.

When the leakage current estimate is not higher than the protection level (No of S210), the OBC 100 and the HV battery 300 may maintain the charging operation (S220). After a predetermined period elapses, operation S210 may be repeated.

When the leakage current estimate is higher than the protection level (Yes of S210), the leakage current protecting device 230 may transmit the charge stop request to the HV battery 300 to temporarily stop the charging of the HV battery (S230). In addition, the leakage current protecting device 230 may increase the failure count by a predetermined number (e.g., 1). In the embodiment, an initial value of the failure count may be zero (0), however it should not be limited thereto or thereby.

The leakage current protecting device 230 may control the DC relay 150 right after the charging of the HV battery 300 is temporarily stopped to cut off the leakage current path (S240). In embodiments, since a Y-capacitor path with parts of the DC power source is blocked when the DC relay 150 is turned off, the leakage current of the entire vehicle may be reduced, and it is possible to provide an environment capable of diagnosing whether the leakage current due to the common mode power source of the AC power source 50 is currently occurring.

The leakage current protecting device 230 may compare a current failure count with the count upper limit (S250). For example, the count upper limit may be in a range from 5 to 10, however, it should not be limited thereto or thereby.

When the current failure count is larger than the count upper limit (Yes of S250), it is estimated that the leakage current continuously occurs in a state where the leakage current estimate is higher than the protection level by a predetermined number of times or more during the charging. Accordingly, the leakage current protecting device 230 may determine the diagnosis result in which the leakage current occurs and may terminate the charging of the HV battery 300 without transmitting the charge restart request to the HV battery 300 (S290).

Operation S250 is to prevent unnecessary repetition of operations, such as charging, stopping, and restarting, because, when the leakage current estimate fluctuates near the protection level of the earth leakage circuit breaker, the leakage current is reduced, and the protection logic continues while the DC relay 150 is turned off even in a situation where there is a high possibility of the leakage current.

When the current failure count is not larger than the count upper limit (No of S250), the leakage current protecting device 230 may compare the leakage current estimate with the predetermined protection level again (S260).

When the leakage current estimate is not higher than the protection level (No of S260), the leakage current protecting device 230 may turn on the DC relay 150 (S270).

The leakage current protecting device 230 may transmit the charge restart request to the HV battery 300 and may restart the charging of the HV battery 300 (S280).

When the leakage current estimate is still higher than the protection level (Yes of S260), it is estimated that the leakage current occurs in the same manner as before even when the DC relay 150 is turned off. Accordingly, the leakage current protecting device 230 may determine the diagnosis result in which the leakage current occurs and may terminate the charging of the HV battery 300 without transmitting the charge restart request to the HV battery 300 (S290).

Figure 7:
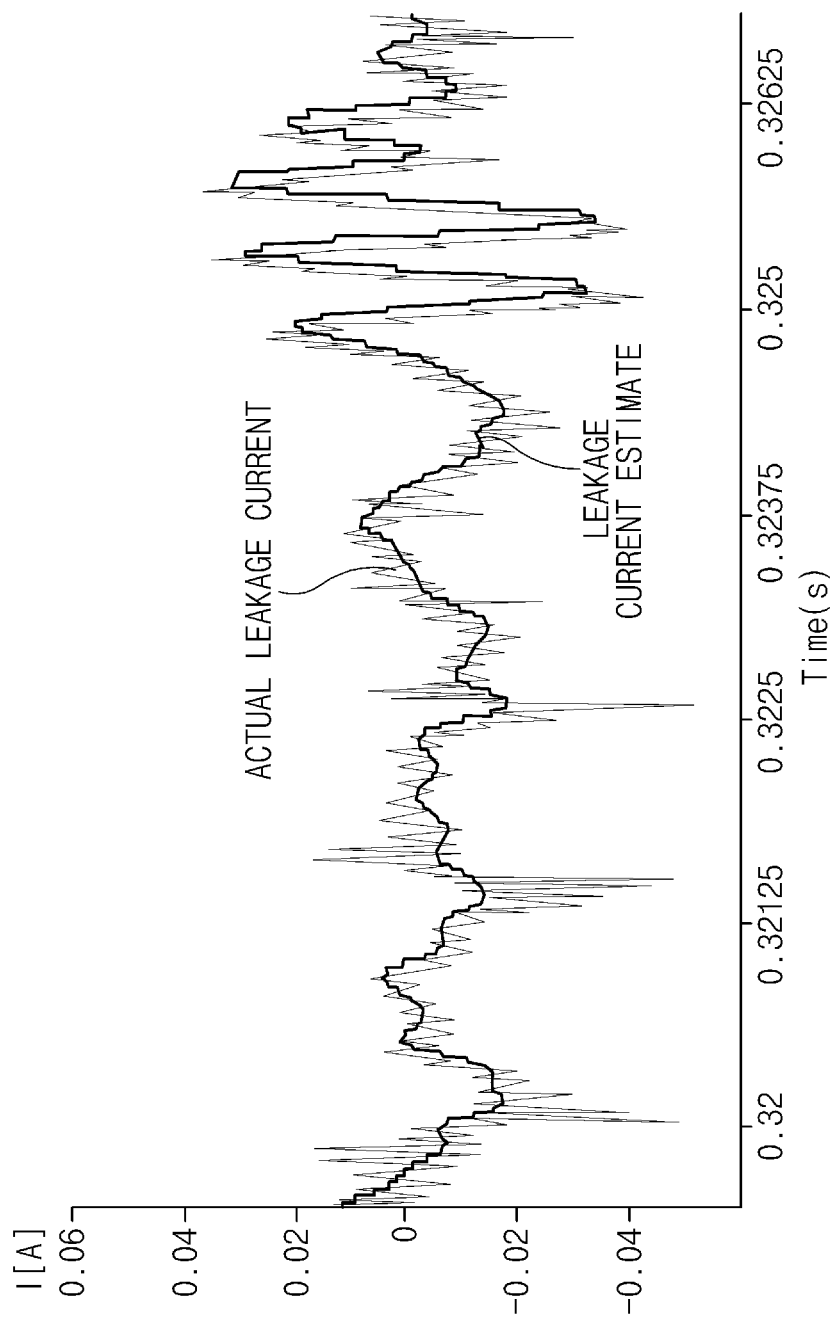
FIG. 7 is a graph showing a simulated result of an actual leakage current value of the OBC and a leakage current estimate according to an embodiment of the present disclosure.

FIG. 7 is a graph showing a simulated result of an actual leakage current value of the OBC and the leakage current estimate according to an embodiment of the present disclosure.

Referring to FIG. 7, the graph that illustrates the result of comparing the actual leakage current of the OBC with the leakage current estimate generated by the leakage current estimating device 220 over time is shown. In embodiments, the leakage current estimating device 220 estimates the leakage current by applying the LPF of about 1 kHz band width.

As seen from the graph, a high-frequency noise component of the actual leakage current value is removed, and the leakage current estimate is formed such that an average value of the actual leakage current value and an average value of the leakage current estimate are substantially equal to each other at each time.

In embodiments, the OBC and the operation method of the OBC according to the embodiment of the present invention may accurately estimate the actual leakage current value without using the separate leakage current sensor.

In addition, since the leakage current path is blocked when the leakage current instantaneously increases, the cut-off operation by the earth leakage circuit breaker may be prevented or minimized in advance. Further, the charging state may be maintained even when the leakage current is abnormally high, and thus the charging robustness may be enhanced.

The operations of the methods or algorithms described in connection with the embodiments disclosed in the specification may be directly implemented with a hardware module, a software module, or combinations thereof, executed by a processor. The software module may reside on a storage medium, such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor. The processor may read out information from the storage medium and may write information in the storage medium. Alternatively, the storage medium may be integrated with the processor. The integrated processor and storage medium may reside in an application specific integrated circuit (ASIC). The ASIC may reside in a user terminal. Alternatively, the integrated processor and storage medium may reside as a separate component of the user terminal.

While the present invention has been described with reference to embodiments, it will be apparent to those skilled in the art that various changes and modifications may be made without departing from the spirit and scope of the present invention.

Therefore, embodiments of the present invention are not limiting, but illustrative, and the spirit and scope of the present invention is not limited thereto. The spirit and scope of the present invention should be interpreted by the following claims, and it should be interpreted that all technical ideas which are equivalent to the present invention are included in the spirit and scope of the present invention.

What is claimed is:

1. A method of operating an on-board charger for charging a high voltage battery of an electrically-charged vehicle, comprising:
   supplying a DC voltage converted from an AC voltage to the high voltage battery to perform a charging operation;
   measuring an internal voltage of a DC EMI filter that is configured to remove noise of the DC voltage;
   calculating a leakage current estimate based on the internal voltage; and
   controlling the charging operation in accordance with the leakage current estimate,
   wherein calculating the leakage current estimate comprises:
   removing a high-frequency noise component from the internal voltage of the DC EMI filter;
   performing a time derivative on the internal voltage to calculate a current per a unit capacitance; and
   multiplying the current per a unit capacitance by a Y-capacitor coefficient to obtain the leakage current estimate.

2. The method of claim 1, wherein supplying comprises:
   removing noise of the AC voltage;
   converting the AC voltage to the DC voltage; and
   removing the noise from the DC voltage.

3. The method of claim 1, wherein the internal voltage of the DC EMI filter is a voltage across a Y-capacitor included in the DC EMI filter.

4. The method of claim 1, wherein the high-frequency noise component has a frequency band of about 1 kHz or more.

5. The method of claim 1, wherein the Y-capacitor coefficient is a sum of capacitances of Y capacitors included in the DC EMI filter.

6. The method of claim 1, wherein the controlling of the charging operation comprises:
   temporarily stopping the charging operation when the leakage current estimate is higher than a protection level;
   blocking a current path of a DC voltage side of the on-board charger;
   restarting the charging operation when the leakage current estimate is equal to or lower than the protection level after a predetermined time elapses; and terminating the charging operation when the leakage current estimate is higher than the protection level after the predetermined time elapses.

7. The method of claim 6, wherein the temporarily stopping of the charging operation comprises transmitting a charge stop request to the high voltage battery.

8. The method of claim 6, wherein the restarting of the charging operation comprises transmitting a charge restart request to the high voltage battery.

9. The method of claim 6, wherein the temporarily stopping of the charging operation comprises increasing a failure count and further comprises:
comparing the failure count with a count upper limit after the blocking of the current path; and
terminating the charging operation when the failure count exceeds the count upper limit.

10. An on-board charger for charging a high voltage battery of an electrically-charged vehicle, comprising:
a power converter configured to convert an AC voltage to a DC voltage for supplying the DC voltage to the high voltage battery to perform a charging operation, the power converter comprising a DC EMI filter; and
a controller comprising:
a DC voltage measuring device configured to measure an internal voltage of the DC EMI filter for removing noise of the DC voltage;
a leakage current estimating device configured to calculate a leakage current estimate based on the internal voltage; and
a leakage current protecting device configured to control the charging operation in accordance with the leakage current estimate,
wherein the leakage current estimating device comprises:
a low pass filter configured to remove a high-frequency noise component from the internal voltage of the DC EMI filter;
a derivative operator configured to perform a time derivative on the internal voltage to calculate a current per a unit capacitance; and
a multiplication operator configured to multiply the current per a unit capacitance by a Y-capacitor coefficient to generate the leakage current estimate.

11. The on-board charger of claim 10, wherein the power conversion device further comprises:
an AC EMI filter configured to remove noise of the AC voltage;
a power factor correction converter configured to convert the AC voltage to the DC voltage while performing power factor correction; and a DC/DC converter configured to change a voltage level of the DC voltage.

12. The on-board charger of claim 10, wherein the internal voltage of the DC EMI filter is a voltage across a Y-capacitor included in the DC EMI filter.

13. The on-board charger of claim 10, wherein the high-frequency noise component has a frequency band of about 1 kHz or more, and
wherein the Y-capacitor coefficient is a sum of capacitances of Y capacitors included in the DC EMI filter.

14. The on-board charger of claim 10, wherein the leakage current protecting device is configured to:
temporarily stop the charging operation when the leakage current estimate is higher than a protection level;
block a current path of a DC voltage side of the on-board charger;
restart the charging operation when the leakage current estimate is equal to or lower than the protection level after a predetermined time elapses; and
terminate the charging operation when the leakage current estimate is higher than the protection level after the predetermined time elapses.

15. The on-board charger of claim 14, wherein the leakage current protecting device is configured to transmit a charge stop request to the high voltage battery and to temporarily stop the charging operation, and
wherein the leakage current protecting device is configured to transmit a charge restart request to the high voltage battery and to restart the charging operation.

16. The on-board charger of claim 14, wherein the leakage current protecting device is configured to:
increase a failure count while temporarily stopping the charging operation;
compare the failure count with a count upper limit after blocking the current path; and
terminate the charging operation when the failure count exceeds the count upper limit.

17. The on-board charger of claim 10, further comprising a DC relay that connects or blocks a current path of a DC voltage side of the on-board charger.

18. An electrically-charged vehicle comprising:
the on-board charger of claim 10;
a high voltage battery charged with a DC voltage provided from the OBC; and
an inverter configured to drive a motor using the DC voltage discharged from the high voltage battery.

* * * * *